E. N. LIGHTFOOT.
ELECTRIC HEATING APPLIANCE.
APPLICATION FILED MAR. 19, 1917.
1,321,649.
Patented Nov. 11, 1919.
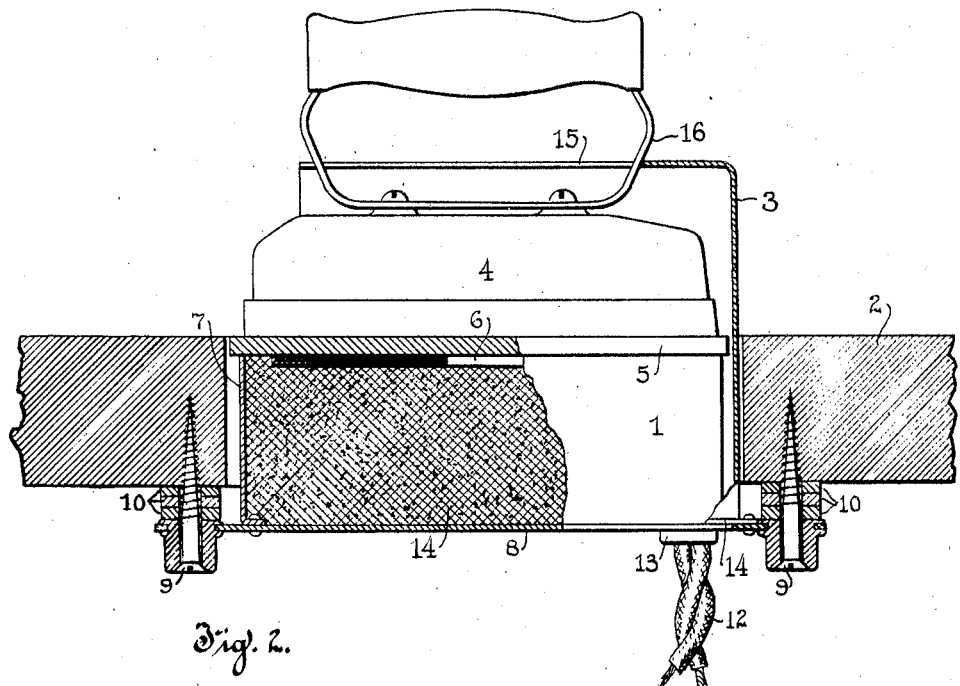
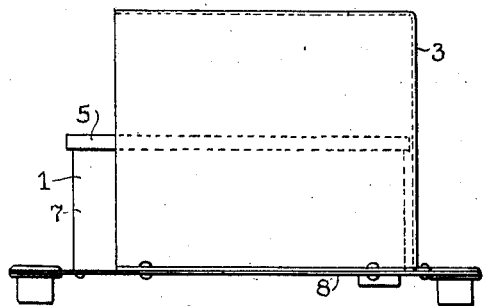
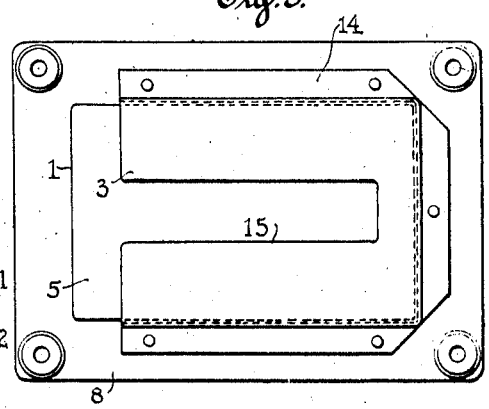
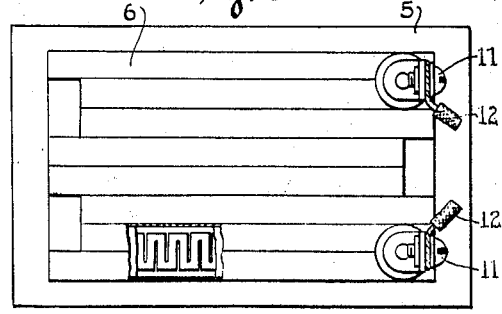
Inventor
Edwin N. Lightfoot
By Frank A. Hubbard
Attorney

UNITED STATES PATENT OFFICE.

EDWIN N. LIGHTFOOT, OF NEW YORK, N. Y., ASSIGNOR TO THE CUTLER-HAMMER MFG. CO., OF MILWAUKEE, WISCONSIN, A CORPORATION OF WISCONSIN.

ELECTRIC HEATING APPLIANCE.

1,321,649.   Specification of Letters Patent.   Patented Nov. 11, 1919.

Application filed March 19, 1917. Serial No. 155,783.

*To all whom it may concern:*

Be it known that I, EDWIN N. LIGHTFOOT, a citizen of the United States, residing at New York, in the county of Bronx and State of New York, have invented new and useful Improvements in Electric Heating Appliances, of which the following is a full, clear, concise, and exact description, reference being had to the accompanying drawing, forming a part of this specification.

This invention relates to electric heating appliances and more particularly to the heating of tools.

Numerous industrial operations, notably in shoe factories, laundries, etc., employing hand irons require only a relatively low heat and an intermittent action of the iron and in such cases the externally heated iron possesses numerous advantages over the internally heated type. Among such advantages are the absence of the conductor cord resulting in greater freedom of action and reduced maintenance cost. Other advantages reside in the use of cheaper and more durable heating means and more efficient heat insulation which are possible in a permanently located heater.

The present invention has among its objects the provision of simple, durable and efficient means for heating of irons of the character stated.

A further object is to facilitate the use of irons, of the character stated, in conjunction with the heating means, and to insure proper coöperation between the iron and the heating means.

Other objects and advantages will hereinafter appear.

In the accompanying drawing, wherein is illustrated an embodiment of the invention.

Figure 1 is a vertical sectional view of the heating appliance showing the manner of mounting thereof and the coöperation of the iron therewith;

Fig. 2 is a side elevational view of the heating appliance on a reduced scale.

Fig. 3 is a plan view of the heater; and,

Fig. 4 is a detail view of the heating element.

Referring to the drawing, the appliance comprises in general, an electric stove 1 secured to a work bench 2 with its top in flush relation with the surface of said bench and a combined shield and positioning member 3 extending above the stove for housing and positioning a hand iron 4 in process of being heated.

The stove 1 comprises a flat plate 5 of suitable heat conducting properties having a series of flat type heating units 6 welded or otherwise secured to the lower face thereof. A rectangular shell 7 is also secured to the lower face of said plate outside the heating units 6, said shell extending downwardly from said plate. A closure member 8 is secured to the bottom of the shell 7 by means of screws, said closure member extending an appreciable distance beyond the said shell to serve as attaching means for securing the stove to the bench. Wood screws 9, 9 passing through the projecting edges of the closure member 8 serve to anchor the stove to the bench from beneath, the height of said stove being determined by inserting suitable spacing washers 10 to bring the top of the plate 5 in flush relation with the upper surface of the bench.

The heating units 6 which are substantially of the character disclosed and claimed in Patent No. 1,150,426 granted Aug. 17, 1915 to W. S. Hadaway, Jr., are connected in series, the outside units being provided with suitable screw terminals 11 for connection with current conductors 12 which enter the stove at 13. The space within the stove is filled with suitable heat insulating material 14 such as mineral wool, whereby the heat output of the units 6 is directed to the plate 5.

The shield 3 comprises a piece of sheet metal bent to substantially surround the stove 1 on three of its sides, the top of the shield being spaced an appreciable distance from the heating plate 5 to permit introduction of the iron 4 therebetween. Flanges 14 are provided on the lower portion of the shield 3 whereby the latter is secured to the closure member 8 by means of suitable screws or rivets, while the top of the shield is centrally slotted at 15 to receive the handle 16 of the iron.

By the above construction, in heating the iron the same need not be lifted by the operator, but may be simply slid along the bench and beneath the shield 3 which serves to insure positioning of the iron upon the heating plate 5 whenever the former is introduced thereunder, whereby the labor, time and attention required in operating the iron are greatly reduced. The shield 3 further serves to retain the heat of the plate against radiation into the surrounding air.

What I claim as new and desire to secure by Letters Patent is:

1. The combination with a work bench, of a tool heater secured thereto, a flanged extension on the bottom of said heater secured to the under side of said bench and suitable spacers to be inserted between said extension and said bench to provide positioning of said stove with its upper face in flush relation with the top of said bench.

2. The combination with a work bench, of a tool heater secured thereto with its top in flush relation with the top of said bench, and a guiding and stop member extending above said heater to insure proper positioning of the tool to be heated when the latter is placed upon said heater.

3. The combination with a work bench, of a tool heater secured thereto with its top in flush relation with the top of said bench, and a guiding and stop member extending above said heater to insure proper positioning of the tool to be heated when the latter is placed upon said heater, said member substantially surrounding said tool to retain the heat thereof.

4. A tool heater comprising a heat conducting plate, heating means secured thereto, means for directing and substantially limiting the effect of said heating means to said plate, tool positioning means extending above said plate in spaced relation thereto and adjustable means providing for securing said heater to a suitable support with said plate in flush relation with the surface of said support.

In witness whereof I have hereunto subscribed my name.

EDWIN N. LIGHTFOOT.

Witnesses:
G. P. BROCKWAY,
HENRY DIECKS.